Dec. 3, 1963  W. C. HARMON ETAL  3,112,642
APPARATUS FOR MEASURING SURFACE ROUGHNESS
Filed May 6, 1960  4 Sheets-Sheet 1

INVENTORS
WILLIAM C. HARMON
TYLER W. JUDD
BY
W. H. Woodlief
ATTORNEY

Dec. 3, 1963  W. C. HARMON ETAL  3,112,642
APPARATUS FOR MEASURING SURFACE ROUGHNESS
Filed May 6, 1960  4 Sheets-Sheet 2

INVENTORS
WILLIAM C. HARMON
TYLER W. JUDD
BY
W. H. Woodlief
ATTORNEY

Dec. 3, 1963  W. C. HARMON ETAL  3,112,642
APPARATUS FOR MEASURING SURFACE ROUGHNESS
Filed May 6, 1960  4 Sheets-Sheet 3
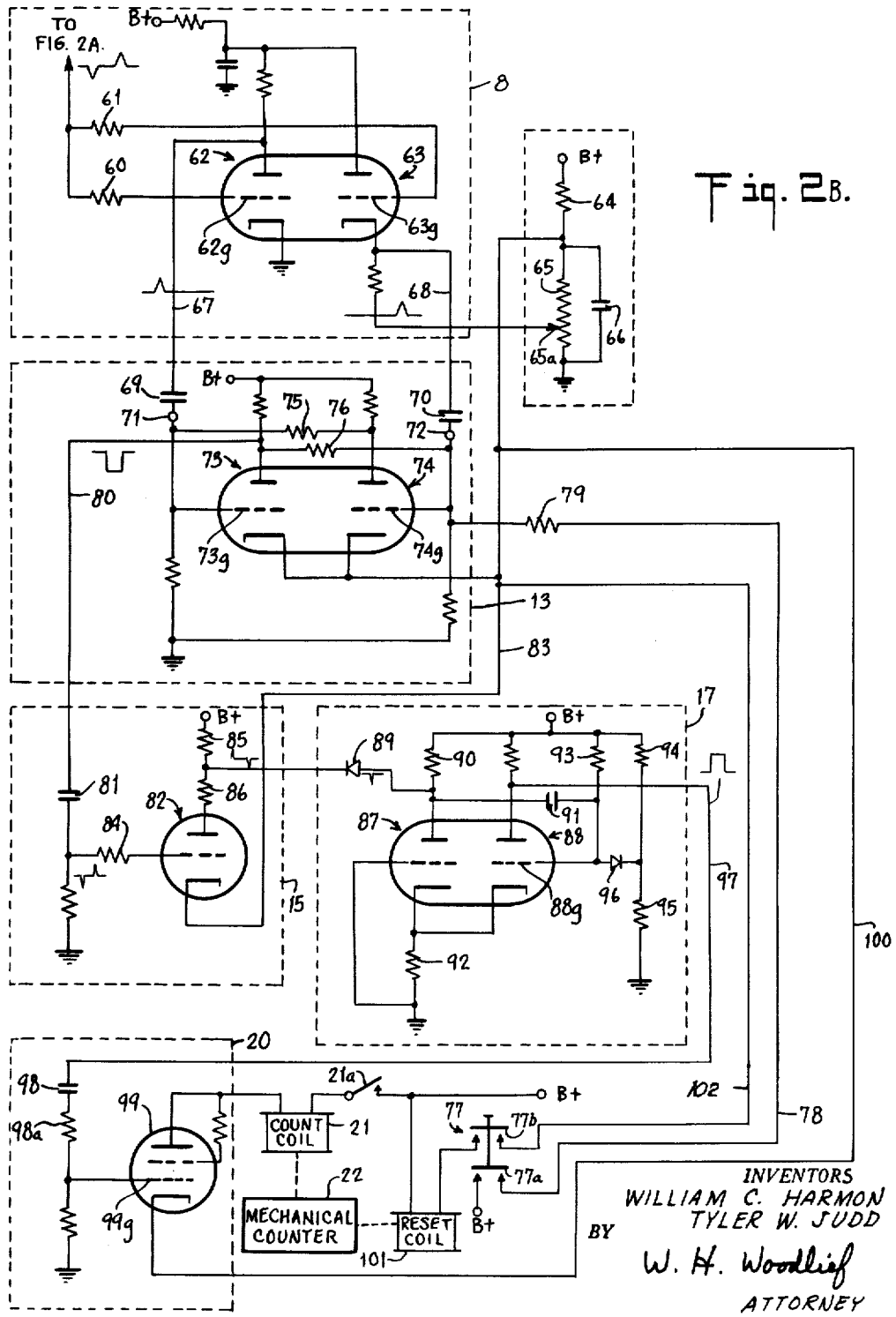
INVENTORS
WILLIAM C. HARMON
TYLER W. JUDD
BY W. H. Woodlief
ATTORNEY

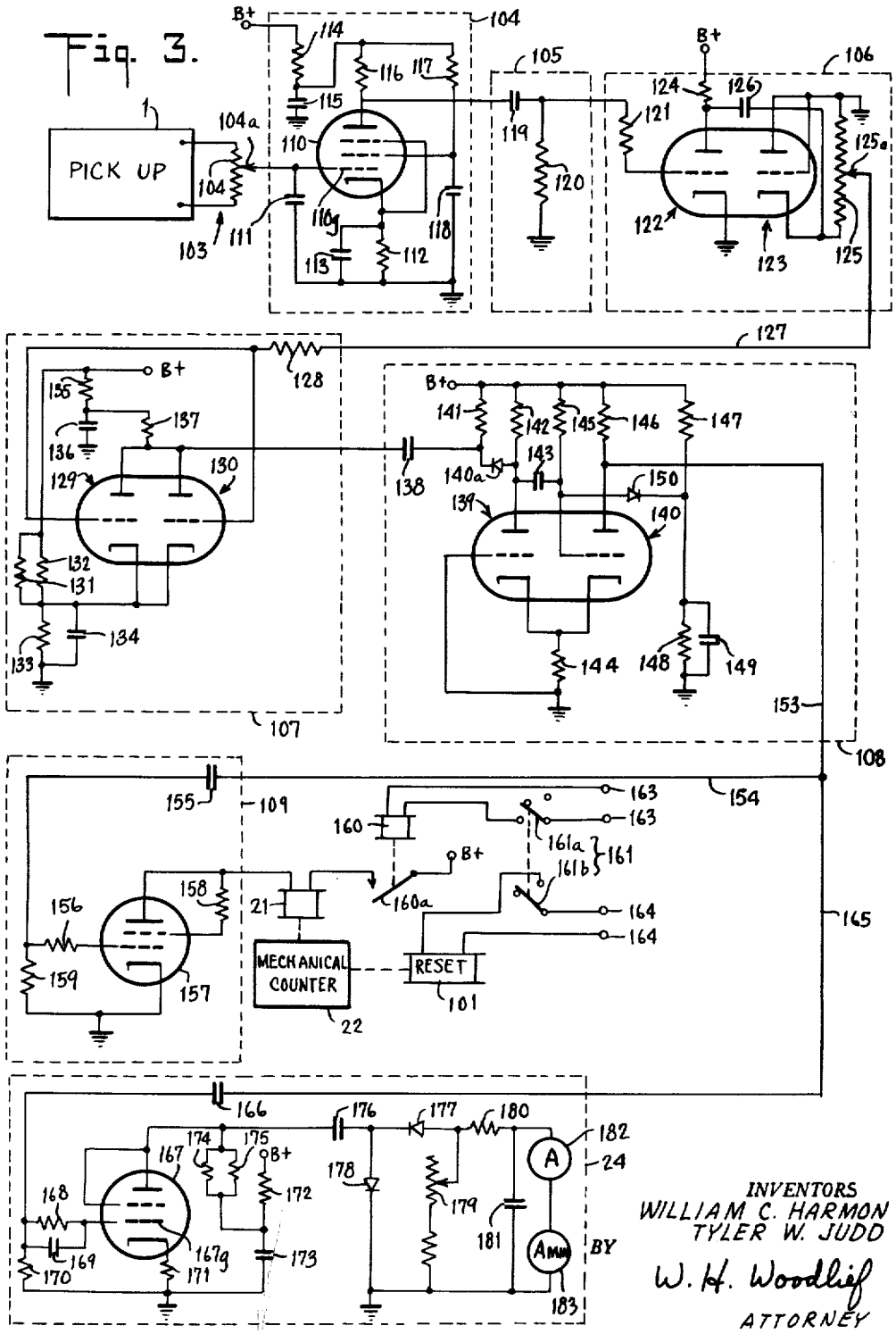

United States Patent Office 3,112,642
Patented Dec. 3, 1963

---

3,112,642
APPARATUS FOR MEASURING SURFACE ROUGHNESS
William C. Harmon, Chagrin Falls, and Tyler W. Judd, Chardon, Ohio, assignors to Republic Steel Corporation, Cleveland, Ohio, a corporation of New Jersey
Filed May 6, 1960, Ser. No. 27,363
4 Claims. (Cl. 73—105)

This invention relates to methods and apparatus for measuring surface roughness characteristics, and particularly to methods which include counting the number of roughness peaks per unit linear distance and apparatus for carrying out such methods.

It has been the practice in the prior art to measure surface roughness by measuring the average height of the uneven peaks of the surface. This average height may be determined on either an arithmetic or R.M.S. basis. By height is meant distance in a direction perpendicular to the surface whose roughness is being measured.

It has been discovered that in many cases the average height technique for meausring roughness is not adequate to provide a basis for classifying material either as acceptable or unacceptable, particularly in the case of rolled steel sheets and strips having a matte finish. The roughness is supposed to give an indication of the suitability of the steel for certain further manufacturing operations, as for example drawing, or the applying of finish coats of metal (e.g., by plating), paint, enamel or the like. It has been found that in some instances the steel sheets would pass the established criterion as to roughness as measured by the average height, but would be turned down by the purchaser as not having adequate characteristics when it came to the later drawing or coating operations. The sheets might fail during drawing or the applied coatings might fail to stick.

There is disclosed in the copending application of W. C. Harmon, Serial No. 25,329, filed April 28, 1960, a method of rolling steel sheets in which the criterion of roughness employed is based on the number of roughness peaks per linear inch rather than on the average roughness height. The characteristic identified in the copending Harmon application as "peaks per inch" may be sometimes spoken of as "peaks per unit linear distance," or as "average peak spacing" or as the "horizontal component of roughness." It has been found that, with steel sheets, about 140 peaks per inch are usually needed to provide a matte finished sheet or strip having the required characteristics with respect to further treatment, e.g., plating, drawing and coating. For some uses, peak counts as low as 100 per inch are acceptable. About 200 peaks per inch provides a more desirable quality of steel in these respects, but steel whose roughness is within the 140 peak per inch limit is reasonably satisfactory.

The apparatus used for measuring average roughness height typically consists of a pick-up unit including a stylus having a fine point, e.g., a diamond, movable over the surface, and connected to a sensitive electronic transducer so as to vary an electrical current or potential in proportion to the changes in the surface contours. Since the contours involved are of the order of microinches (millionths of an inch), it is apparent that the stylus and transducer must be very sensitive. The transducer is commonly connected through an amplifier to suitable indicating or recording mechanism.

The recording mechanism may be used to trace an enlarged profile of the surface whose roughness is being measured. The indicating mechanism may be utilized to produce an indication of the average arithmetic height or the average deviation from a median plane. R.M.S. values are sometimes employed instead of arithmetic values. Some instruments have been proposed in which the meter readings are integrated so as to show the total deviation over a substantial distance.

Profile traces of the type just described may be used in the steel rolling method of the Harmon application mentioned above to provide a count of the roughness peaks per inch. Such peak counting methods are tedious and time consuming.

An object of the present invention is to provide improved methods and apparatus for the measurement of surface roughness characteristics.

Another object of the present invention is to provide methods and apparatus for the measurement of the number of roughness peaks per unit linear distance, or as it may be inversely expressed, the average roughness peak spacing.

Another object of the present invention is to provide apparatus for measuring the average roughness peak spacing on a surface.

A further object of the invention is to provide apparatus for counting the roughness peaks traversed by a pick-up unit.

A further object is to provide apparatus for measuring the average roughness peak spacing over a predetermined distance of travel of the pick-up unit and for continuously indicating that average spacing.

Another object is to provide apparatus which will both count the total roughness peaks and indicate the average peak spacing.

The foregoing objects are attained in the methods and apparatus described herein.

The most comprehensive method of measuring surface roughness according to the invention includes a measurement of the average roughness height using the prior art apparatus, a measurement of the number of roughness peaks per unit distance, and a measurement of the roughness peak spacing. In the more simplified methods of the invention, only one of the latter two measurements may be made by the apparatus described herein.

In the preferred form of that apparatus, the output of the pick-up unit is connected to an automatic gain control circuit which provides substantially constant amplitude output regardless of the height of the roughness peaks. The output of the automatic gain control circuit is transmitted through a filter which selects the range of frequencies of the peaks to be counted or whose spacing is to be measured. The output of the filter is transmitted to a differentiator which converts the filtered signal to sharply peaked pulses of opposite polarities. A clipper standardizes the height of these peaked pulses and separates them according to their polarity, inverts the negative pulses and directs the two sets of peaked pulses to the two inputs of a bistable multivibrator circuit. The output of the bistable multivibrator is passed through a limiter stage and then to a monostable multivibrator which produces a series of square wave output pulses, each of a fixed duration, corresponding in number to the peaks to be counted. The output of the monostable multivibrator may be directed into one or both of two branches. One branch includes an amplifier driving the operating coil of a mechanical counter. The other branch includes an amplifier driving an averaging circuit for producing in an ammeter an indication of the average pulse frequency over a predetermined time.

For the purposes of comparing different sheet samples, it is essential that the counter readings be taken over traverses of equal length. On the other hand, when samples are compared on the basis of average peak spacing or pulse frequency, it is essential that those readings be taken at the same velocity of movement of the pick-up stylus over the surface being measured.

A simplified modification of the invention is also illustrated, which is useful for many applications. The simplified circuit uses a manually set attenuator in place of the automatic gain control. It also omits the bistable multivibrator, thereby providing substantial simplification at some expense with respect to accuracy.

In either the preferred modification or the simplified modification, the peak counter may be used without the average peak spacing meter or the peak spacing meter may be used without the counter. There are certain advantages, however, to using both the peak counter and the average peak spacing meter.

Other objects and advantages of the present invention will become apparent from a consideration of the following specification and claims, taken together with the accompanying drawings.

In the drawings:

FIG. 1 is a block diagram of the preferred form of the invention, together with graphical illustrations of the wave forms at various points in the apparatus;

FIGS. 2A and 2B, taken together, comprise a wiring diagram of the preferred embodiment of the invention, following the block diagram of FIG. 1, but omitting the average peak spacing meter;

FIG. 3 is a wiring diagram of a simplified modification of the invention; and

FIG. 1

Figures 1, 4:
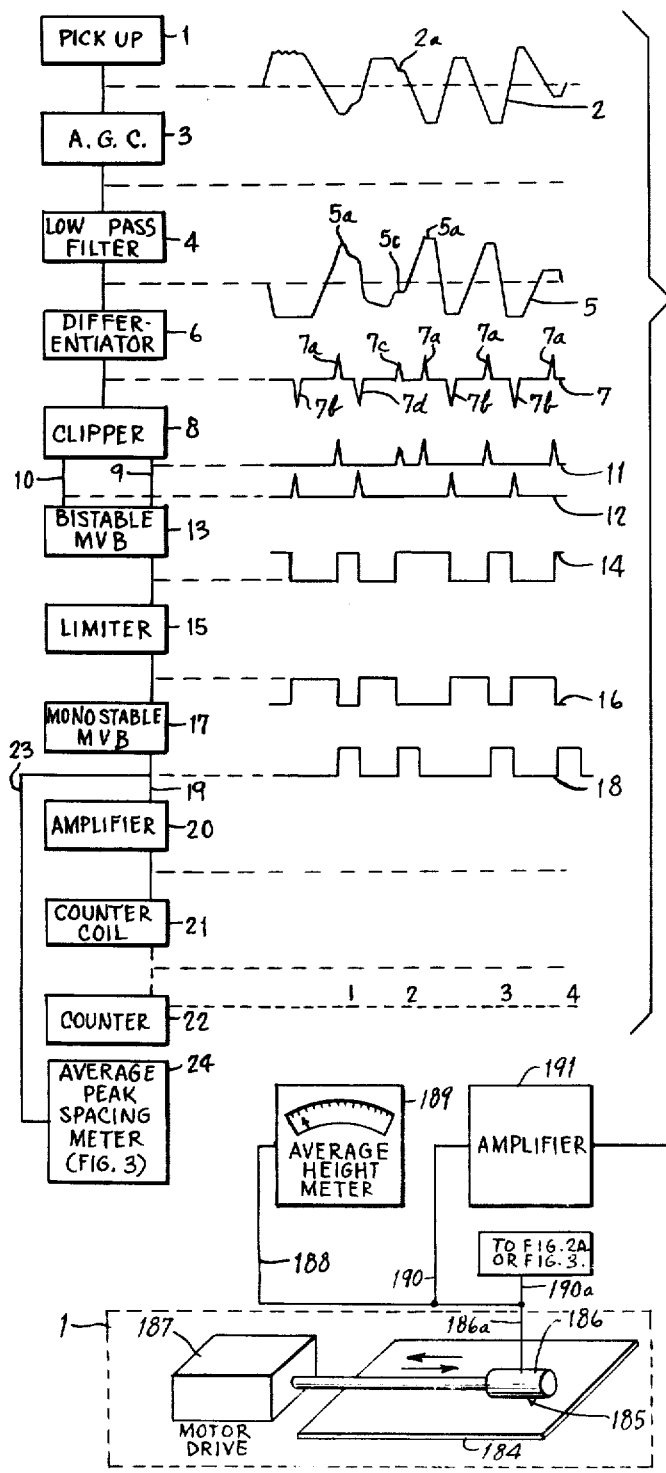
FIG. 4 is a schematic illustration of a prior art mechanism which serves as the pick-up unit indicated in FIGS. 1, 2 and 3.

This figure illustrates schematically apparatus in accordance with the invention for counting the number of roughness peaks per unit linear distance. This apparatus is shown in detail in FIGS. 2A and 2B and is described in detail below in connection with those figures. FIG. 1 is provided to give an overall picture of the apparatus.

As shown in FIG. 1, the apparatus includes a pick-up unit 1, which may consist of certain components of prior art mechanisms used for measuring the average height of the roughness peaks. Such a prior art apparatus is shown in somewhat more detail, but still diagrammatically, in FIG. 4. The output of the pick-up unit is an electrical wave illustrated graphically at 2, which represents a profile of the surface whose roughness is being measured. The output of the pick-up unit is fed to an automatic gain control circuit 3, whose function is to even out variations in amplitude in the wave 2, so that the subsequent circuit components receive waves of a standard amplitude. By virtue of this gain control circuit, it is not necessary for an operator of the apparatus to make individual adjustments of the gain between samples which are being tested.

The output of the automatic gain control circuit 3 is fed to a filter circuit 4, which attenuates the components whose frequencies are higher than the band of interest in the sample under investigation. For example, in apparatus for measuring the roughness of a matte finish on rolled steel, where the transducer in the pick-up unit moved at a speed of ⅛ inch per second over the surface, the frequency range passed by the filter 4 was below 50 cycles per second. The curve 5 represents the output of the filter 4. It may be seen by comparing the curve 5 with the curve 2, that most of the high frequency components had been eliminated in curve 5.

The output of filter 4 is fed to a differentiator 6 whose output consists of a series of sharply peaked pulses which are coincident with the points of maximum rate of change of slope of the curve 5, i.e., the sharpest points in the profile. The curve of these pulses is shown at 7 of FIG. 1. It will be noted that the curve 7 includes pulses of both polarities with respect to a datum potential. Typically, but not necessarily, the pulses of curve 7 are coincident with the maxima and minima of curve 5. See the pulses 7c and 7d, which are atypical in this respect.

The output of differentiator 6 is fed to a clipper 8 which separates the positive pulses from the negative pulses, and inverts the latter. The clipper 8 has two output lines 9 and 10. The line 9 carries a series of pulses shown at 11, coincident with positive output pulses from the differentiator 6. The line 10 carries a series of positive pulses 12, coincident with negative output pulses from the differentiator 6.

The output line 9 and 10 are connected to a bistable multivibrator 13, whose output shifts from a more negative stable value to a more positive stable value in response to one of the pulses in line 9, and shifts back from the more positive value to the more negative value in response to one of the pulses in line 10. The square wave output of the multivibrator 13 is shown by the line 14 in FIG. 1. This square wave output is fed to a limiter circuit 15, which also inverts the wave to give the output wave shown at 16. It may be seen that the square waves in the line 16 vary in duration. These are fed to a monostable multivibrator 17 which produces an output wave consisting of square waves of a standardized duration, as shown at 18. It may be seen that each of the square waves in the line 18 has its beginning coincident with the beginning of a square wave in the line 16, but that the durations of the waves in the line 18 are all equal. The output of the multivibrator 17 is fed into two branches, one through a line 19 to an amplifier 20 having output characteristics suitable for energizing the coil 21 of a mechanical counter 22.

The other branch connected to the output of multivibrator 17 leads through a wire 23 to an average peak spacing meter 24 shown in detail in FIG. 3.

Figure 2A:
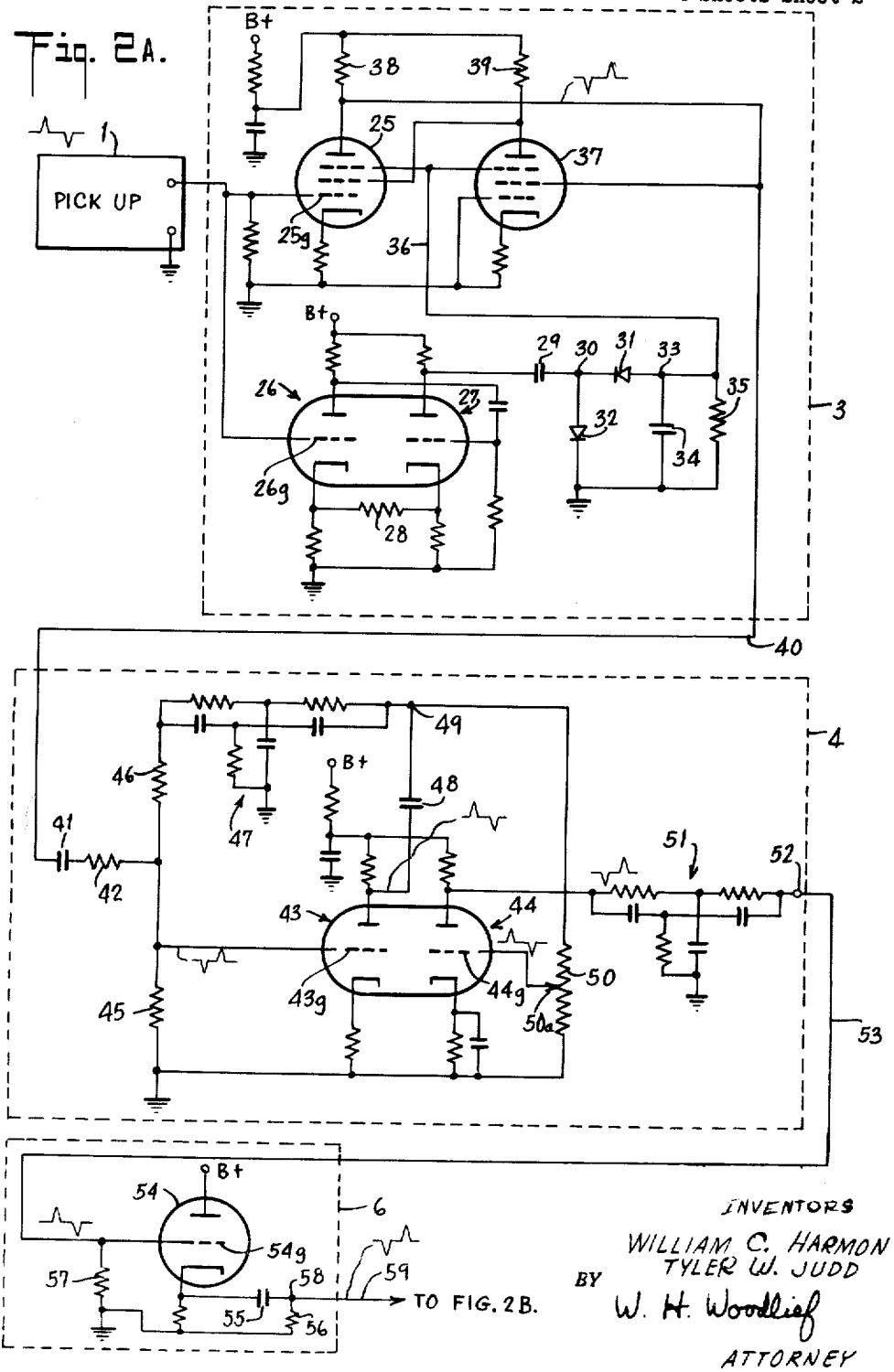

FIGS. 2A and 2B

The input signal from the pick-up unit 1 is supplied to the control grid 25g of a pentode 25, which may be a type 5879, and is also supplied to the control grid 26g of one triode 26 of a twin triode 26, 27 which may be a type 12AU7. The two triodes 26 and 27 are connected as conventional cascaded amplifiers, except for a 30,000 ohm resistor 28 connected between the cathodes. The resistor 28 provides a small positive feedback which serves to increase the overall gain of the stage, and avoids the need for large cathode bypass capacitors which are sometimes used for a similar purpose. The output is taken from the anode of the triode 27 and is fed through a capacitor 29 to the common junction 30 of two type 1N645 silicon diodes 31 and 32. The cathode of diode 31 and the anode of diode 32 are connected to the junction 30. The diodes 31 and 32 are connected as a half wave voltage doubler and serve to rectify the signal voltage. The output of the voltage doubler is taken between ground and a junction 33 connected to the anode of diode 31. The potential at junction 33 is negative with respect to ground and is proportional to the input signal amplitude. A capacitor 34 and a resistor 35 are connected between junction 33 and ground and serve as a filter for the output of the voltage doubler. The potential at output terminal 33 is fed through a wire 36 to the suppressor grids of pentode 25 and another pentode 37, which may also be a type 5879. The amplification capability of the tubes 25 and 37 is an inverse function of the negative suppressor grid potential, which, as supplied from terminal 33 is proportional to the output of the signal input. The gain of the tubes 25 and 37 is therefore inversely proportional to the signal input amplitude. The signal at the anode is inverted in relation to the input signal at the grid.

The tube 37 is not connected directly into the signal circuit, but is used as a "dummy" to balance the plate and screen grid currents of the tube 25, so that the sum of the currents passing through the load resistors 38 and 39 remains essentially constant under dynamic conditions.

This arrangement provides smooth, transient-free operation without resorting to the complications of push-pull circuits.

The output of the automatic gain control circuit 3 is taken through a wire 40 connected to the anode of tube 25. The wire 40 leads through a coupling capacitor 41 and a resistor 42 to the control grid 43g of a triode 43 comprising one-half of a twin triode 43, 44. Control grid 43g is also connected through a resistor 45 to ground and through a resistor 46 to a parallel-T filter network generally indicated at 47, and a capacitor 48 to the anode of triode 43. The common junction 49 between the filter network 47 and capacitor 48 is connected to ground through a resistor 50 provided with a variable slider 50a, which is in turn connected to the control grid 44g of triode 44. The anode of triode 44 is connected through a second parallel-T filter network 51 to an output terminal 52 of the filter circuit 4.

The resistor 42 isolates the filter network 47 from the load imposed by the previous stages. The filter network 47 is constructed to provide attenuation at frequencies above approximately 48 cycles. The filter 47 provides a negative feedback path from the output of triode 43 to its input. This negative feedback path is effective at higher frequencies remote from 48 cycles and thus reduces the gain at those frequencies.

The slider 50a cooperating with the resistor 50 provides the means of adjusting the gain of the filter 4. The filter 51 is designed to provide attenuation above 70 cycles. The cooperative action of the filter networks 47 and 51 is to provide a smooth and reasonably sharp frequency characteristic which is high below 50 cycles and starts to drop at that frequency, and is reduced approximately 35 decibels at 70 cycles.

The filter 4 has two general purposes. One purpose is to attenuate hum and noise frequencies which may be present in the signal. The other purpose is to compensate for the frequency characteristic of the following differentiator network 6. The latter network, in common with all differentiators, has an inherent characteristic which tends to accentuate high frequencies having high rates of change of signal potential, and to attenuate low frequencies, having relatively low rates of change of signal potential.

The output signal of the filter 4 is taken from the terminal 52 through a wire 53 to the control grid 54g of a triode 54, which may be one-half of a type 12AU7 twin triode. The triode 54 is connected as a cathode follower and presents a high impedance to the output of the filter 4, as is necessary for proper operation. In addition, it provides a low impedance output to drive the differentiating network consisting of capacitor 55 and resistor 56. A resistor 57 is connected between grid 54g and ground, and provides proper voltage distribution so that the grid 54g may be coupled through filter network 51 to the anode of triode 44 without the use of a coupling capacitor.

The time constant of the differentiating network including capacitor 55 and resistor 56 is short as compared to the period of input signals which are being counted. Consequently, the output of the differentiator network 6 is a series of positive and negative peaked pulses coincident with the reversals in the slope of the wave form of the incoming signal. This output is taken from the common terminal 58 of capacitor 55 and resistor 56.

The output of differentiator 6 is connected through a wire 59 and resistors 60 and 61, respectively, to the control grids 62g and 63g of twin triodes 62, 63 of the clipper 8. The triode 62 is operated without grid bias and hence will clip off positive signals while passing negative signals. The triode 63 on the other hand is biased to cut off. It therefore clips off negative signals while passing positive signals. Bias potential is supplied to the triode 63 by means of a voltage divider including resistors 64 and 65. Resistor 65 has a slider contact 65a which permits bias voltage adjustment. A capacitor 66 bypasses the resistor 65 and serves as a filter for the bias potential. The resistors 60 and 61 isolate the clipper stages (triodes 62 and 63) from each other so as to prevent interaction between them. Outputs are taken from the anode of triode 62 through wire 67 and from the cathode of triode 63 through wire 68, and thence through coupling capacitors 69 and 70, respectively, to the two input terminals 71 and 72 of the bistable multivibrator 13.

The multivibrator 13 includes two triodes 73 and 74 which may be the two halves of a twin triode, for example a type 12AT7.

Each of the peaks to be counted is characterized by a maximum followed by a minimum in the input wave form (see curve 2, FIG. 1). Typically and desirably, each maximum produces a positive peak 7a in the wave form 7 at the output of the differentiator, and each minimum produces a negative peak 7b in that wave form.

The sharpest peaks in the output of a differentiating circuit are coincident with the greatest rates of change in its input potential. In the present situation, if the peaks and valleys of the profile are relatively sharp and the shoulders, if any, on the intervening slopes are relatively rounded, then the output pulses from the differentiator 6 coincide with the peaks and valleys of the profile. There may occur sharp shoulders on the slopes between the peaks and valleys, as at 5c in FIG. 1 which shoulder produces a sharp output pulse from the differentiator 6. This phenomenon constitutes possible source of error in a count of the peaks. This source of error is substantially overcome in the present apparatus by the use of the bistable multivibrator 13. The bistable multivibrator 13 is provided so as to supply a single square wave output pulse only in response to a negative pulse 7b followed by a positive pulse 7a, thereby eliminating most false counts due to the source of possible error just described.

The grids 73g and 74g of the triodes 73 and 74 are cross coupled to the anodes of the opposite triodes through resistors 75 and 76. As is well known in multivibrator circuits, when either of the two triodes 73, 74 is conducting, the other triode is cut off. At the beginning of a count with the apparatus disclosed, the triode 74 is rendered conductive by the momentary closing of a reset switch 77 having a contact 77a which connects a wire 78 to the positive terminal of the B supply. Wire 78 is connected through a resistor 79 to grid 74g. The switch 77 is spring biased to open position and is momentarily closed at the start of each new count.

The output of multivibrator 13 is taken from the anode of triode 73 through a wire 80. After operation of the reset switch 77, triode 74 is conducting and triode 73 is cut off. The first switching of the multivibrator therefore is accomplished by one of the negative pulses 7b in line 7 of FIG. 1, which has been inverted to a positive pulse by the clipper 8 and appears at the grid 73g as one of the positive pulses in line 12 of FIG. 1. This pulse switches the multivibrator turning the triode 73 On and the triode 74 Off. The output potential at the anode of triode 73 drops to a more negative value due to the potential drop in the load resistor, as illustrated in line 14 of FIG. 1. When the next positive pulse 7a appears at grid 74 g, the multivibrator 13 is switched back again to its initial condition, completing a square wave output at the anode of triode 73.

Wire 80 is connected to the input of the limiter circuit 15 through a coupling capacitor 81.

The limiter 15 comprises a triode 82 which may be one-half of a type 12AU7 twin triode. The cathode of triode 82 is connected through a wire 83 to the common junction of the resistors 64 and 65, so that triode 82 is biased below cut off. A series grid resistor 84 limits the grid current to a safe value. The load connected to the anode of triode 82 consists of two series connected resistors 85 and 86. The output from the limiter 15 is taken from the common junction of the resistors 85 and 86. The limiter stage inverts the signal supplied to it, as is common with triode stages, the output signal appearing at 16 in FIG. 1.

The output signal from limiter 15 is supplied to the monostable multivibrator 17, which includes two sections of a twin triode 87, 88. Output pulses from the limiter 15 are fed to the anode of tube 87 through a silicon diode 89. The anode of triode 87 is connected to the positive B supply through a load resistor 90 and to the grid 88g of triode 88 through a capacitor 91. The cathodes of triodes 87 and 88 are connected together and are grounded through a bias resistor 92. The grid of triode 87 is connected to ground. The grid of the triode 88 is connected to the positive B supply through a resistor 93.

The monostable multivibrator provides one output pulse of a predetermined fixed duration for each input triggering pulse. The input pulses may vary in amplitude, wave shape and duration, but the output pulses are constant in all these respects. The triode 88 is normally conducting heavily due to the bias provided by a voltage divider including resistor 93, two further resistors 94 and 95, and a diode 96. The triode 87 is held cut off by the potential across resistor 92. With triode 87 cut off, the potential at its anode is substantially that of the positive B terminal and the potentials at both terminals of diode 89 are approximately the same. Under these conditions the diode 89 can pass applied negative trigger pulses to the control electrode 88g of triode 88. When such a pulse is received at grid 88g, diode 96 is reversely biased and becomes nonconductive, and triode 88 is cut off. At the same time, triode 87 becomes conductive by virtue of the coupling through the common cathode resistor 92. When triode 87 becomes conducting, the potential at its anode, and hence at the anode of diode 89, is greatly reduced. This reversely biases the diode 89 and makes it nonconductive, thereby isolating the multivibrator from the previous stages. The conditions of triodes 87 and 88 just described continue until the negative charge on capacitor 91 is dissipated through resistors 93 and 90. This charge was introduced by the negative input pulse and maintains the triode 88 cut off until it is substantially dissipated. As soon as the charge of capacitor 91 falls to a value such that the triode 88 is no longer cut off, triode 88 again starts to conduct and produces a potential drop across resistor 92 which cuts off the triode 87, restoring the multivibrator to its normal or stable state.

When the multivibrator 17 is in its stable state, the silicon diode 96 holds the grid 88g at a fixed reference potential, as determined by the divider action of the resistors 93, 94 and 95. By virtue of this fixed potential, the initial charge of capacitor 91 is always uniform. This assures operational stability, so that the output pulses are positive square waves of fixed duration taken from the anode of triode 88 through a wire 97 and a coupling capacitor 98.

Signals are transmitted through the coupling capacitor 98 to the input of the amplifier 20 including a tetrode 99, which may be a type 6AQ5. The coupling capacitor 98 is connected through a resistor 98a to the control grid 99g of tetrode 99. The output of tetrode 99 is connected through the operating coil 21 of the mechanical counter 22 and a switch 21a to the positive terminal of a power supply indicated at B+. The cathode of tetrode 99 is connected through a wire 100 to the common junction of the voltage divider resistors 64 and 65.

The counter 22 is provided with a reset coil 101, and is so constructed that the dial or cyclometer of the counter is restored to zero by energization of the reset coil. Mechanical counters operated by coils such as that diagrammatically indicated at 21 and provided with reset coils, such as that shown at 101, are common in the art. The details of their construction form no part of the present invention. The energization circuit for the reset coil 101 is controlled by the contact 77b of the reset switch 77 and may be traced from the B+ terminal through the coil 101, contact 77b, and a wire 102 to the common junction of the voltage divider resistors 64 and 65.

*FIG. 3*

This figure illustrates a modified form of peak counting apparatus which is considerably simplified as compared to the apparatus of FIGS. 2A and 2B. Because of the simplification, there has been some loss of accuracy, as will be explained in detail below. There is also shown in detail in this circuit an average peak spacing meter 24, which was disclosed only diagrammatically in FIG. 1. As described in greater detail below, this average peak spacing meter 24 may be utilized in connection with the counter circuit of FIGS. 2A and 2B.

The principal units in the counter of FIG. 3 include the pick-up unit 1, which may be the same as the corresponding unit of FIGS. 1 and 2A, which is shown in somewhat more detail in FIG. 4. The output of the pick-up unit 1 is fed to an attenuator 103, whose output is in turn supplied to a linear amplifier 104 which feeds a differentiating network 105. The output of the network 105 is transferred through two cascade-connected limiters 106 and 107 to a monostable multivibrator 108. The output of the multivibrator 108 is fed to an amplifier 109 which drives a mechanical counter 22 having an actuating coil 21 and a reset coil 101. The output of the multivibrator 108 is also fed to the average peak spacing meter 24.

Those elements in FIG. 3 which are the same as their counterparts in the preceding figures have been given the same reference numerals, and will not be further described.

Considering the circuit in detail, the attenuator 103 comprises a resistor 104 having a slider or movable tap 104a by which the attenuation may be manually adjusted. The function of the attenuator 104a is similar to that of the automatic gain control circuit 3 in FIGS. 1 and 2, except that it must be manually adjusted for each sample instead of automatically adjusting itself.

The tap 104a is connected to the control grid 110g of a pentode 110 which may be a type 6AU6, and which is connected to operate as a linear amplifier. The grid 110g is bypassed to ground by a capacitor 111. The cathode of pentode 110 is connected to ground through a resistor 112 bypassed by a capacitor 113. The suppressor grid is connected to the cathode. A decoupling network including a resistor 114 and a capacitor 115 is connected between the B positive terminal and ground. The common junction between resistor 114 and capacitor 115 is connected to the anode of pentode 110 through a resistor 116, and to the screen grid of the pentode 110 through a resistor 117. The screen grid is bypassed to ground by means of a capacitor 118.

The linear amplifier 104 provides a uniform increase in the signal level as required to drive the following stages. The capacitor 111 bypasses high frequency noise and transients. The circuit components should be chosen to provide high gain and good response to low frequency signals.

The output of the amplifier 104 is taken from the anode of pentode 110 and is fed to a differentiating network including a capacitor 119 and a resistor 120 connected between the right-hand terminal of capacitor 119, as it appears in the drawing, and ground. The time constant of this network (approximately .01 second) is short as compared to the periods of the input pulses which it is desired to differentiate. Consequently, differentiation of those pulses occurs. Wave forms of the lowest frequencies, however, are shifted in phase and reduced in amplitude, but are not otherwise altered. The components have been selected to present a load impedance to the previous stage which provides maximum stage gain at the lower frequencies (5 to 50 cycles per second). This action tends to compensate for the frequency discrimination presented by this network (i.e., any differentiating circuit tends to produce a higher output signal in response to a more rapid change of the input signal and thus tends to accentuate the higher frequencies and to attenuate the lower ones).

The output of the differentiating network 105 is taken from the common terminal of capacitor 119 and resistor 120 and is connected through a resistor 121 to the grid of a triode 122, which may be one-half of a twin triode 122, 123. The twin triode 122, 123 may be a type 12AT7.

The triode 122 is used as a grid limiter. The cathode of triode 122 is grounded. The anode is connected to the B positive terminal through a load resistor 124. This stage operates without bias and therefore limits positive-going pulses. Negative-going pulses however are further amplified. The triode 123 has its grid and anode tied together and so acts as a diode, serving as a positive clamp. Its anode is connected to ground and a resistor 125 having a slider 125a is connected between the cathode and ground. The output of triode 122 is coupled through a capacitor 126 to the cathode of triode 123. The triode 123, acting as a diode, effectively clamps any negative excursions of the signals passing through capacitor 126, so that the only signals appearing at the slider 125a are positive with respect to ground. These signals are connected through a wire 127 and a resistor 128 to the second limiter stage 107, which includes a twin triode 129, 130, which may be of the 12AT7 type, having its two triodes connected in parallel. Input signals passing through resistor 128 are fed to the grids of the triodes 129, 130. The cathodes of triodes 129, 130 are connected to the B positive terminal through parallel resistors 131, 132, and to ground through a resistor 133 bypassed by a capacitor 134. A decoupling network including a resistor 135 and a capacitor 136 is connected between the B positive terminal and ground. The anodes of the triodes 129, 130 are connected through a load resistor 137 to the common junction of resistor 135 and capacitor 136.

The limiter stage 107 is operated with semi-fixed bias due to the potential drop across the resistor 133. Consequently, input pulses are limited at the value of this bias potential. All pulses which it is desired to count are amplified in the preceding stages to the extent that they will over-drive this stage. Consequently, the output of limiter stage 107 consists of pulses of nearly equal amplitude. The output of stage 107 is taken from the anodes of triodes 129, 130 and is supplied to the input of monostable multivibrator 108 through a coupling capacitor 138. The multivibrator 108 includes triodes 139, 140, which may be the two halves of a type 12AT7 twin triode. Signal pulses from the limiter stage 107 are fed to the anode of triode 139 through the capacitor 138 and a silicon diode 140a. The junction of capacitor 138 and diode 140a is connected to the B positive terminal through a resistor 141. The anode of triode 139 and hence the anode of diode 140a are connected to the B positive terminal through a resistor 142. The anode of triode 139 is connected to the grid of triode 140 through a coupling capacitor 143. The grid of triode 139 is connected to ground. The cathodes of triodes 139 and 140 are tied together and grounded through a bias resistor 144. The grid of triode 140 is connected to the B positive terminal through a resistor 145. The anode of triode 140 is connected to the B positive terminal through a resistor 146. A voltage divider including resistors 147 and 148 is connected between the B positive terminal and ground. The resistor 148 is bypassed by a capacitor 149. The common terminal of resistors 147 and 148 is connected to the grid of triode 140 through a silicon diode 150. Both the silicon diodes 140a and 150 may be type 1N538.

The output of the multivibrator 108 is taken from the anode of triode 140 and is coupled to two loads in parallel, namely an amplifier 109 driving the coil 21 of counter 22, and another amplifier driving the average peak spacing meter 24.

The monostable multivibrator 108 provides one output pulse for each input pulse. The input pulses may vary in amplitude, wave shape and duration, but the output pulses are constant in all these respects. The triode 140 is normally conducting heavily due to the bias provided by the action of resistors 145, 147, 148 and diode 150. Triode 139 is held at cut off by the potential developed across resistor 144. With triode 139 cut off, the potential at its anode is substantially equal to that of the B positive terminal, so that the potentials at both terminals of the diode 140a are substantially the same. Under these conditions, the diode 140a conducts applied negative trigger pulses passing through the capacitor 138, and these pulses pass on through the capacitor 143 to the grid of triode 140. As one of these pulses swings that grid negative, the diode 150 becomes reverse biased and therefore non-conductive and triode 140 is cut off. This same negative pulse charges the capacitor 143 with its right-hand terminal negative. As triode 140 cuts off, the potential drop across resistor 144 is reduced, and the triode 139 becomes conductive. With triode 139 conducting, the potential at its anode, and hence at the anode of diode 140a, is greatly reduced. Diode 140a is thereby reverse biased and becomes non-conductive, isolating the multivibrator from any further input pulses so long as the triode 139 continues to conduct. The charge on capacitor 143 gradually leaks off through resistors 142 and 145. As that charge leaks off, the diode 150 becomes conducting again and the positive bias is restored to the grid of triode 140, whereupon the multivibrator returns to its stable state with the triode 140 conducting and the triode 139 cut off. When the multivibrator is in its stable state, the diode 150, in cooperation with resistors 145, 147 and 148, holds the grid of triode 140 at a fixed reference potential. By virtue of this fixed potential, the initial charge on capacitor 143 is uniform. Consequently, the output pulses from the multivibrator are uniform as to amplitude and duration. These output pulses are taken from the anode of triode 140.

The multivibrator 108 is designed to follow trigger pulses up to about 50 cycles (about 400 peaks per inch). The counter 22 is capable of following counts of this frequency. The signal from the anode of triode 140 is coupled to the amplifier 109 through wires 153 and 154 and a coupling capacitor 155, which is connected through a resistor 156 to the control grid of a tetrode 157. The tetrode 157 may be type 6AQ5. The screen grid is tied to the anode through a resistor 158. The junction of resistor 156 and capacitor 155 is connected to ground through a resistor 159. A bias source may be used in series with resistor 159. The actuating coil 21 of the mechanical counter 22 is connected in series with the anode of tetrode 157. The opposite terminal of the coil 21 is connected through a relay contact 160a of a relay 160 to the B positive terminal. The coil of relay 160 is connected through one finger 161a of a double pole switch 161 to power supply terminals 163. The reset winding 101 of counter 22 is connected through another finger 161b of the switch 161 to power supply terminals 164. When the switch 161 is in its upper position shown in the drawing, the reset coil 101 is energized so that the counter 22 is reset to zero. When switch 161 is in its lower position, the reset coil 101 is de-energized and relay winding 160 is energized to close contact 160a so that the actuating winding may be energized to start a count on the counter 22.

The output signals from the multivibrator 108 are connected to the average peak spacing meter 24 through wire 153, a wire 165, and a coupling capacitor 166, which is connected to the control grid 167g of a tetrode 167 through a resistor 168 bypassed by a capacitor 169. The tetrode 167 may be a type 6AQ5. The junction of capacitor 166 and resistor 168 is connected to ground through a resistor 170. The cathode of tetrode 167 is grounded through a bias resistor 171. A resistor 172 and a capacitor 173 form a decoupling network between the B positive supply and ground. The common terminal of the resistor 172 and capacitor 173 is connected through parallel resistors 174, 175 to the anode of tetrode 167.

The input pulses received at the grid of tetrode 167 correspond in frequency to the recurrence rate of surface irregularities being measured. The amplifier stage including tetrode 167 produces an increase in signal level as required to drive the following stage. Furthermore, it isolates the multivibrator 108 from the following frequency measuring stage.

Output pulses from the anode of tetrode 167 are coupled through a capacitor 176 to the common junction of two diodes 177 and 178. The cathode of diode 178 is grounded, and its anode is connected to the cathode of diode 177. The anode of diode 177 is connected to ground through a variable resistor 179 and is connected through a resistor 180 and a capacitor 181 which parallel the variable resistor 179. An ammeter 182 and a minimum registering ammeter 183 are connected in series across the terminals of capacitor 181; meter 183 may control a signal.

The input pulses to the frequency indicator through capacitor 176 consist of negative-going pulses (having been inverted by the amplifier 167). Diode 177 conducts during the time that a pulse is applied and current flows through the meters 182 and 183 and the parallel capacitor 181 is charged. At the end of the pulse, the diode 178 conducts sufficiently to remove the small charge developed on the capacitor 176. Since a given current flows through the meter each time a pulse is applied, the average current increases as the pulse recurrence frequency increases and decreases as this frequency decreases. The meter reading then is directly proportional to the recurrence frequency or inversely proportional to the average peak spacing. The meter may be calibrated to read directly in terms of peak recurrence frequency or in terms of peak spacing. The variable resistor 179 may be used to calibrate the meters. The resistor 180 and the capacitor 181 form a filter to increase effectively the damping of the meter so that it reads average current rather than following the pulses.

The specifications for a particular sample of material whose surface roughness is being measured may include a maximum limit on the average peak spacing or a corresponding minimum limit on the peak recurrence frequency. It may therefore be convenient to employ a minimum registering ammeter such as that shown at 183 to provide a positive record if the specified peak spacing limit is exceeded, rather than requiring the operator to continuously watch a conventional ammeter throughout a test run to see what its minimum reading is.

The average peak spacing meter 24 reads the average pulse spacing over a predetermined time. If the stylus of the pick-up unit is being driven at a constant speed, then this average pulse spacing is a direct indication of the average peak spacing in the material. The length of time over which the average is taken depends upon the ballistic damping on the meter and on the electrical damping provided by resistor 180 and capacitor 181. These damping effects may be varied as desired to conform to the roughness specifications for the material.

The circuit of FIG. 3 is simplified as compared to the circuit of FIGS. 2A and 2B by the substitution of the attenuator 103 for the automatic gain control circuit 3. The circuit of FIG. 3 is further simplified by the omission of the bistable multivibrator stage 13. While these simplifications reduce the complication and cost of this circuit, they are nevertheless made at some expense with respect to convenience of operation and accuracy.

For example, when using the circuit of FIG. 3 on a number of successive samples, the attenuator 103 would probably have to be adjusted for each sample, whereas if the circuit of FIGS. 2A and 2B were being used, the automatic gain control 3 would take care of the difference between samples without manual adjustment.

As explained in connection with FIGS. 2A and 2B, that circuit distinguishes between a flat ledge on the side of a peak, as shown at 5c and 7c in FIG. 1, and a true peak, as shown at 5a and 7a. The circuit of FIGS. 2A and 2B counts the true peaks and ignores the ledges such as 5c. The circuit of FIG. 3, without the bistable multivibrator, would give equal weight to a pulse 7c and to a pulse 7a and would therefore count the ledges along with the true peaks. The count produced by the circuit of FIG. 3 might therefore be somewhat inaccurate as compared to the count produced by the circuit of FIGS. 2A and 2B, particularly if the surface contour being measured were one with a large number of "ledge" contours.

*FIG. 4*

This figure illustrates a mechanism which is used in the prior art to measure the average roughness height, and which may be utilized in cooperation with the counters and peak spacing meters of the present invention to determine completely the roughness characteristics of the samples being measured.

There is shown in FIG. 4 a sample 184 whose roughness is being measured. The measuring apparatus includes a pick-up unit 1, which includes a stylus 185 forming part of a transducer 186, which is driven over the surface of the sample 184 by a motor drive mechanism schematically indicated at 187. The transducer 186 sends an electrical signal through a wire 188 to an average height meter 189, through a wire 190 to an amplifier 191, and through a wire 190a to the input of either the circuit of FIG. 2A or that of FIG. 3. The amplifier 191 is shown as having an output wire 192 connected to a recorder 193 which draws an amplified profile of the surface being measured on a conventional recording chart.

Typical average height measuring mechanisms of the type described in this figure are shown in detail and described in the patent to Abbott, No. 2,240,278, and in the patent to Arndt, No. 2,460,726. Such mechanisms measure the average deviation of the surface profile from a median line.

In order to specify completely the roughness of a surface so that its practical qualities (e.g., drawing qualities and paint receiving qualities) may be definitely predicted, the specifications should include a limitation of the average roughness height, which is the quality measured by the Abbott and Arndt apparatuses, and should also include a specification of the total number of peaks over a specified distance (e.g., one inch) and a specification of the average peak recurrence frequency, with a limitation as to the minimum value of that average peak recurrence frequency. The total peaks may be measured by the counter mechanisms of FIGS. 2A and 2B and FIG. 3. The average peak recurrence frequency may be measured by the recurrence frequency meter 24, sometimes termed the peak spacing meter, which is shown in FIG. 3, but may be used in the circuit of FIG. 2B by connection to the output of the monostable multivibrator 17 in that figure.

In many cases, the specification of the average peak recurrence frequency may be omitted, in which case the meter 24 may be omitted from the apparatus. In some cases, on the other hand, the average peak recurrence frequency may be measured without counting the total peaks. In that even the counter 22 and its driving amplifier may be omitted.

The presently preferred method of measuring the roughness characteristics of a surface in accordance with the present invention, so as to provide a complete and meaningful classification of the surface finish, includes the steps of measuring the average roughness height and simultaneously counting the roughness peaks per unit distance. The count of the roughness peaks may be accomplished preferably by using the peak counting circuit of FIGS. 2A and 2B or alternatively by the peak counting circuit of FIG. 3. In some cases, it may be desirable to include a measurement of the average peak spacing by the use of the meter 24 of FIG. 3, and in other cases that meter alone may be relied upon for the count of roughness peaks.

While specific forms of invention have been described for purposes of illustration, it is contemplated that numerous changes may be made without departing from the spirit of the invention.

What is claimed is:

1. Apparatus for measuring the roughness of a surface, comprising pick-up means for producing an electrical signal varying with the profile of the surface, means for differentiating said signal, a monostable multivibrator, and means connecting the output of the differeniating means to the input of the multivibrator, so that the multivibrator produces an output signal pulse for each peak in the surface being measured, said connecting means including means for discriminating between output pulses of the differentiating means which are positive with respect to a datum and output pulses negative with respect to the datum, a bistable multivibrator having two input terminals and an output terminal, means including said discriminating means for steering one set of differentiated pulses to one input terminal and inverting the other set of pulses and steering the other set of pulses to the other input terminal, and means connecting the output terminal to the input of the monostable multivibrator.

2. Apparatus as defined in claim 1, in which said steering means comprises means for clipping both said sets of pulses at a predetermined amplitude.

3. Apparatus for measuring the roughness of a surface, comprising pick-up means for producing an electrical signal varying with the profile of the surface, means responsive to said signal for producing a sequence of two output pulses upon a variation in said signal indicative of the presence of a peak, a bistable multivibrator having two input terminals and an output terminal, means responsive to one of said sequence of output pulses to supply a triggering pulse to one input terminal of the multivibrator, means responsive to the other of said sequence of output pulses to supply a triggering pulse to the other input terminal of the multivibrator, a monostable multivibrator, and means connecting the output terminal of the bistable multivibrator to the input of the monostable multivibrator, so that the monostable multivibrator produces an output signal pulse for each peak in the surface being measured.

4. Apparatus for measuring the roughness of a surface, comprising:
 (a) pick-up means for producing an electrical signal varying with the profile of a surface, said pick-up means comprising:
  (1) a stylus;
  (2) means supporting the stylus in contact with the surface; and
  (3) means for producing relative movement of the stylus and the surface at a predetermined rate;
 (b) means for differentiating said signal;
 (c) a monostable multivibrator;
 (d) means connecting the output of the differentiating means to the input of the multivibrator, so that the multivibrator produces an output signal pulse for each peak in the surface being measured;
 (e) frequency measuring means connected to the multivibrator output; and
 (f) means for registering the minimum frequency measured by said frequency measuring means.

References Cited in the file of this patent

UNITED STATES PATENTS

| | | |
|---|---|---|
| 2,397,923 | Coss | Apr. 9, 1946 |
| 2,733,598 | Miner | Feb. 7, 1956 |
| 2,739,239 | Bernet | Mar. 20, 1956 |
| 2,956,227 | Pierson | Oct. 11, 1960 |

UNITED STATES PATENT OFFICE
CERTIFICATE OF CORRECTION

Patent No. 3,112,642                                                     December 3, 1963

William C. Harmon et al.

It is hereby certified that error appears in the above numbered patent requiring correction and that the said Letters Patent should read as corrected below.

Column 2, line 40, after "measurements" insert -- is used. Both of the latter measurements --; column 12, line 67, for "even" read -- event --; column 13, line 17, for "differeniating" read -- differentiating --.

Signed and sealed this 16th day of June 1964.

(SEAL)
Attest:

ERNEST W. SWIDER
Attesting Officer

EDWARD J. BRENNER
Commissioner of Patents